April 21, 1942. D. M. REEVES 2,280,083
FOLDING POCKET STEREOSCOPE
Filed Dec. 2, 1939
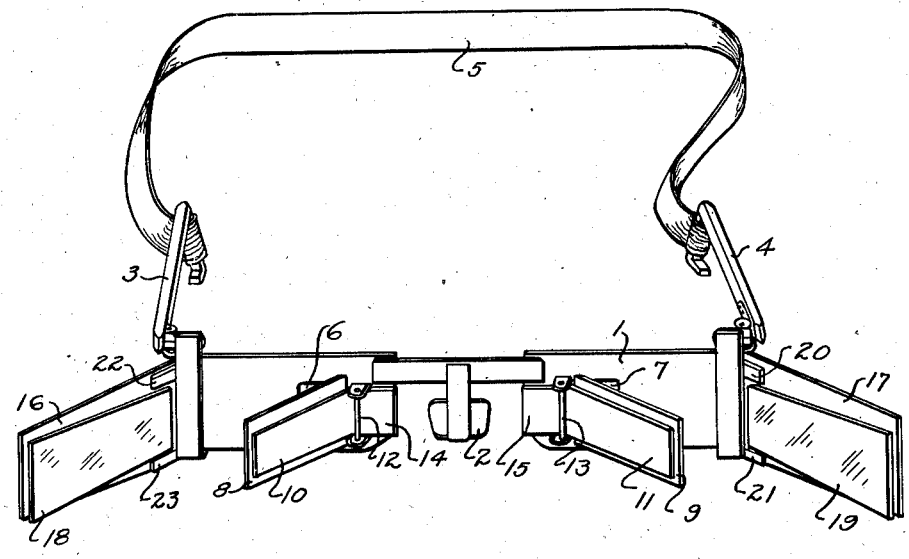
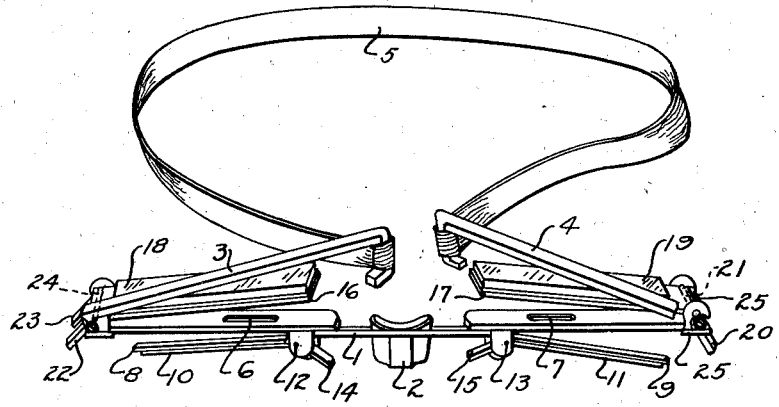
INVENTOR
DACHE M. REEVES Patented Apr. 21, 1942

2,280,083

UNITED STATES PATENT OFFICE 2,280,083

FOLDING POCKET STEREOSCOPE

Dache M. Reeves, Langley Field, Va.

Application December 2, 1939, Serial No. 307,291

3 Claims. (Cl. 88—29)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a stereoscopic device for viewing photographs, to bring the images of said photographs into coincidence and make them appear as one, with the illusion of relief.

The invention particularly relates to a stereoscope of the folding spectacle type, adapted to be worn by an observer and having a mirror system for reflecting the images of the photographs to the vision of the observer.

It is an object of this invention to so arrange the component parts of the stereoscope that it is readily collapsible into a compact arrangement.

It is another object of this invention to provide a spectacle-type stereoscope for observing pictures at variable distances without the necessity for focusing the reflecting means.

It is a further object of this invention to provide a stereoscope for viewing independently-supported aligned pictures placed at any convenient distance from the observer.

Fig. 1 is a perspective view of a stereoscope constructed in accordance with the teachings of the invention, with the mirrors in operative position.

Fig. 2 is a second perspective view of the stereoscope with the parts in partially folded position and with one of the arms partially broken away.

Referring to the drawing:

The stereoscope comprises a relatively flat framework 1 having a nose bridge 2, a pair of ear-engaging arms 3 and 4, and an elastic band 5 adapted to pass around the head of the wearer. The frame 1 is provided with sight openings 6 and 7, and a pair of mirrors 8 and 9 rigidly connected to backing members 10 and 11, which in turn are pivotally connected to the framework 1 by means of pins 12 and 13. Backing members 10 and 11 are provided with stop portions 14 and 15 for positioning the mirrors 8 and 9 at a desired angle with respect to the framework and the sight openings 6 and 7. Also pivotally mounted to the frame 1 by means of pins 24 and 25 are a second pair of plate members 16 and 17, carrying mirrors 18 and 19. The frame is also provided with stop members 20, 21, 22, and 23 for operatively positioning mirrors 18 and 19 at a desired angle with respect to the line of sight.

In the operation of the device the wearer places the stereoscope upon his head in such a way that his eyes can peer through sight openings 6 and 7 to observe, by means of mirrors 10, 11, 18, and 19, a pair of suitably supported aligned photographs (not shown). The photographs may be of comparatively large size and may be conveniently supported on a table or the like. Since the stereoscope is of the mirror reflecting type, focusing of an optical system is not necessary, and a selected portion of the photographs can be brought into visual relief without the necessity for positioning the head at a particular distance from the photographs.

The mirrors 8 and 9 are operatively positioned by stops 14 and 15, while mirrors 18 and 19 are operatively positioned in parallel relation to mirrors 8 and 9 by stops 20, 21, 22, and 23. Since all the mirrors are freely pivotally connected to the frame, mirrors 8 and 9 are movable against one side of the frame and mirrors 18 and 19 are movable against the other side of the frame to collapse or fold the device. Arms 3 and 4 are also pivotally mounted to be moved into folded position as shown in Fig. 2.

It is to be understood that the foregoing description is by way of example only and that it is intended to be limited only by the scope of the appended claims.

I claim:

1. A folding stereoscope comprising a frame having spaced sight openings therein; a pair of mirrors freely pivotally connected to one side of said frame, each of said mirrors being positioned in the line of sight of one of said sight openings; stop means for operatively positioning said mirrors at an acute angle with respect to the line of sight through said openings; a second pair of mirrors, each of which is freely pivotally connected to an extreme end of said frame; and stop means on said one side of said frame for operatively positioning said mirrors in parallel relation with respect to said first pair of mirrors, said first pair of mirrors being rotatable into folded position against said one side of said frame and said other pair of mirrors being rotatable into folded position against the other side of said frame.

2. A folding stereoscope of the spectacle type comprising a frame having spaced sight openings therein; a pair of mirrors, each mirror of which is mounted pivotally on one side of said frame in the line of sight of one of said sight openings, stop means integral with said mirrors for operatively positioning the same at a predetermined angle with respect to said frame, a second pair of mirrors, means for freely pivotally mounting each mirror of said second pair at an extreme end of said frame, and stop means carried by said frame for positioning each mirror of said second pair in operative position parallel to the adjacent mirror of said first pair, whereby said first pair of mirrors may be folded against one side of said frame and said second pair may be rotated into folded position against the other side of said frame.

3. A folding stereoscope of the spectacle type adapted to be attached to the head of a user for stereoscopically viewing horizontally placed maps, comprising a frame member having a pair of spaced sight openings, a first pair of mirrors freely pivotally mounted on said framework, one mirror of which is positioned adjacent each of said sight openings and in the line of sight thereof, stop means for operatively positioning said mirrors at a predetermined angle with respect to said framework, a second pair of mirrors, one mirror of which is freely pivotally mounted at each extreme end of said framework, stop means for operatively positioning each of said second pair of mirrors in parallel relation with the operative position of one of said first pair of mirrors, whereby said first pair of mirrors may be rotated into folded position on one side of said frame, the other pair of mirrors may be rotated into folded position on the other side of said frame and the two pairs of mirrors will be maintained in operative position against said stop means by gravity when viewing horizontally placed maps.

DACHE M. REEVES.